(12) United States Patent
Bien et al.

(10) Patent No.: US 10,636,565 B2
(45) Date of Patent: Apr. 28, 2020

(54) SIGNAL AND POWER TRANSMISSION SYSTEM

(71) Applicant: UNIST (ULSAN NATIONAL INSTITUTE OF SCIENCE AND TECHNOLOGY), Ulsan (KR)

(72) Inventors: Franklin Don Bien, Ulsan (KR); Saikiran Oruganti, Ulsan (KR); Sang Hyun Heo, Ulsan (KR); Hyung Gun Ma, Ulsan (KR); Seok Tae Seo, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 109 days.

(21) Appl. No.: 15/748,505

(22) PCT Filed: Jul. 29, 2016

(86) PCT No.: PCT/KR2016/008396
§ 371 (c)(1),
(2) Date: Jan. 29, 2018

(87) PCT Pub. No.: WO2017/023044
PCT Pub. Date: Feb. 9, 2017

(65) Prior Publication Data
US 2018/0226187 A1 Aug. 9, 2018

(30) Foreign Application Priority Data

Jul. 31, 2015 (KR) .................. 10-2015-0108827

(51) Int. Cl.
*H01F 38/14* (2006.01)
*H02J 5/00* (2016.01)
(Continued)

(52) U.S. Cl.
CPC ............... *H01F 38/14* (2013.01); *H02J 5/00* (2013.01); *H02J 5/005* (2013.01); *H02J 50/00* (2016.02); *H02J 50/20* (2016.02); *H02J 50/80* (2016.02)

(58) Field of Classification Search
CPC . H01F 38/14; H02J 50/00; H02J 50/20; H02J 50/80; H02J 5/00; H02J 5/005
(Continued)

(56) References Cited

U.S. PATENT DOCUMENTS 3,723,110 A * 3/1973 Goffe .................... G03G 5/043
430/31
2008/0070499 A1 3/2008 Wilhelm et al.
(Continued)

FOREIGN PATENT DOCUMENTS

KR 1020100013882 A 2/2010
KR 1020120033756 A 9/2010
(Continued)

OTHER PUBLICATIONS

Extended European Search Report for European Patent Application No. 16833280.7 dated Mar. 1, 2019.
(Continued)

*Primary Examiner* — Hal Kaplan
(74) *Attorney, Agent, or Firm* — Heslin Rothenberg Farley & Mesiti P.C.

(57) ABSTRACT

A signal transmitting/receiving device faces a conductor and communicates with another transmitting/receiving device. A signal transmitting/receiving device communicating with a counterpart device in an electromagnetic induction scheme via an adjacent conductive object, for example, comprises: a first layer which is formed of a conductive material, and comprises at least one opening facing the object; a second layer which is adjacent to the first layer on the side opposite
(Continued)

the object, and is formed of a conductive material; and a third layer which is arranged between the first layer and the second layer, and exchanges an electromagnetic field comprising a signal with the object through the opening.

5 Claims, 7 Drawing Sheets

(51) Int. Cl.
  *H02J 50/00* (2016.01)
  *H02J 50/20* (2016.01)
  *H02J 50/80* (2016.01)

(58) Field of Classification Search
  USPC .......................................................... 307/104
  See application file for complete search history.

(56) References Cited

U.S. PATENT DOCUMENTS

| | | |
|---|---|---|
| 2014/0043208 A1 | 2/2014 | McCormack et al. |
| 2014/0225489 A1 | 8/2014 | Weber et al. |
| 2014/0361855 A1 | 12/2014 | Miyata |
| 2015/0049587 A1 | 2/2015 | Lawry et al. |

FOREIGN PATENT DOCUMENTS

| | | |
|---|---|---|
| KR | 1020120068334 A | 6/2012 |
| KR | 1020140059722 A | 5/2014 |
| WO | 2012/045122 A2 | 4/2012 |

OTHER PUBLICATIONS

International Search Report (and English translation) and Written Opinion of the International Searching Authority for PCT/KR2016/008396 dated Oct. 25, 2016.

Oruganti, S.K., et al., "Investigation of Near-Field Wireless Energy Transfer for Through Metal-Wall Applications", IEEE, pp. 247-250 (2014).

Lawry, T.J., et al., "Penetration-free system for transmission of data and power through solid metal barriers", IEEE Military Communications Conference, pp. 389-395 (2011).

Young, S.S., et al., "Investigation of wireless power transfer in through-wall applications", Asia Pacific Microwave Coference, pp. 403-405 (2012).

Graham, D.J., et al., "Investigation of Methods for Data Communication and Power Delivery Through Metals", Industrial Electronics, IEEE Transactions, vol. 58, No. 10, pp. 4972-4980 (2011).

* cited by examiner

Transmitter 100

Top View

Side View

Spiral Receiver 200

120 mm

200

SIGNAL AND POWER TRANSMISSION SYSTEM

CROSS REFERENCE TO RELATED APPLICATIONS

This application is a national stage filing under section 371 of International Application No. PCT/KR2016/008396, filed on Jul. 29, 2016, and published on Feb. 9, 2017 as WO 2017/023044 A1, which claims priority to Korean Application No. 10-2015-0108827, filed on Jul. 31, 2015. The entire contents of each of said applications are hereby incorporated herein by reference.

TECHNICAL FIELD

Embodiments of the present invention relate to a power and signal transmission system, and more particularly, to a system that may transmit power and a signal using a transmitter/receiver.

BACKGROUND ART

Non-Patent Document [1] suggests axial alignment for a case of devices requiring special sensors to perform transmission and reception, rather than an electromagnetic wireless power transmission device.

Further, Non-Patent Document [2] relates to an electromagnetic wave based wireless power transmission system in through-wall applications.

Further, Non-Patent Document [3] relates to an electromagnetic wave based wireless power transmission device, which may operate at a frequency less than 100 hertz (Hz) with a transmission efficiency below 10%.

In an example of a vessel including hundreds of sections, electromagnetic interference may occur in response to an attempt to transmit wireless energy among the corresponding sections. Thus, holes need to be made on thick metal walls forming the sections of the vessel to transmit power or signals.

DOCUMENTS OF PRIOR ARTS

Patent Document

Korean Patent Application Publication No. 10-2012-0068334 (2012 Jun. 27)

Non-Patent Documents

[1]. Lawry, T. J., G. J. Saulnier, J. D. Ashdown, K. R. Wilt, H. A. Scarton, S. Pascarelle, and J. D. Pinezich. "Penetration-free system for transmission of data and power through solid metal barriers." *IEEE Military Communications Conference*, 2011, pp. 389-395.
[2]. Young, S. S., Hughes, Z., Hoang, M., Isom., D., Minh, N., Rao, S. and Chiao, J. C.:⊚Investigation of wireless power transfer in through-wall applications⊚*Asia Pacific Microwave conference*, 2012, pp. 403-405, doi: 10.1109/APMC.2012.6421612.
[3]. Graham, D. J.; Neasham, J. A.; Sharif, B. S., "Investigation of Methods for Data Communication and Power Delivery Through Metals," Industrial Electronics, IEEE Transactions on, vol. 58, no. 10, pp. 4972, 4980, October 2011

DISCLOSURE OF INVENTION

Technical Solutions

According to an aspect of the present invention, there is provided a signal transmitting/receiving device communicating with a counterpart device using electromagnetic induction through an adjacent conductive object, the signal transmitting/receiving device including a first layer formed of a conductive material, the first layer including at least one opening that faces the object, a second layer formed of a conductive material, the second layer adjacent to the first layer on an opposite side of the object, and a third layer formed of a dielectric material, the third layer disposed between the first layer and the second layer to exchange an electromagnetic field including a signal with the object through the opening.

In a case in which the signal transmitting/receiving device acts as a transmitter, when the electromagnetic field is electrically fed and induced by the first layer, the third layer may radiate the electromagnetic field toward the object.

In a case in which the signal transmitting/receiving device acts as a receiver, when the third layer receives the electromagnetic field from the object through the opening, the third layer may transmit an electrical signal to the first layer and the second layer.

For example, but not limited thereto, at least one of the first layer and the second layer may include copper. Further, the third layer may include at least one of carbon fiber and polycarbonate.

BEST MODE FOR CARRYING OUT THE INVENTION

Figure 1:
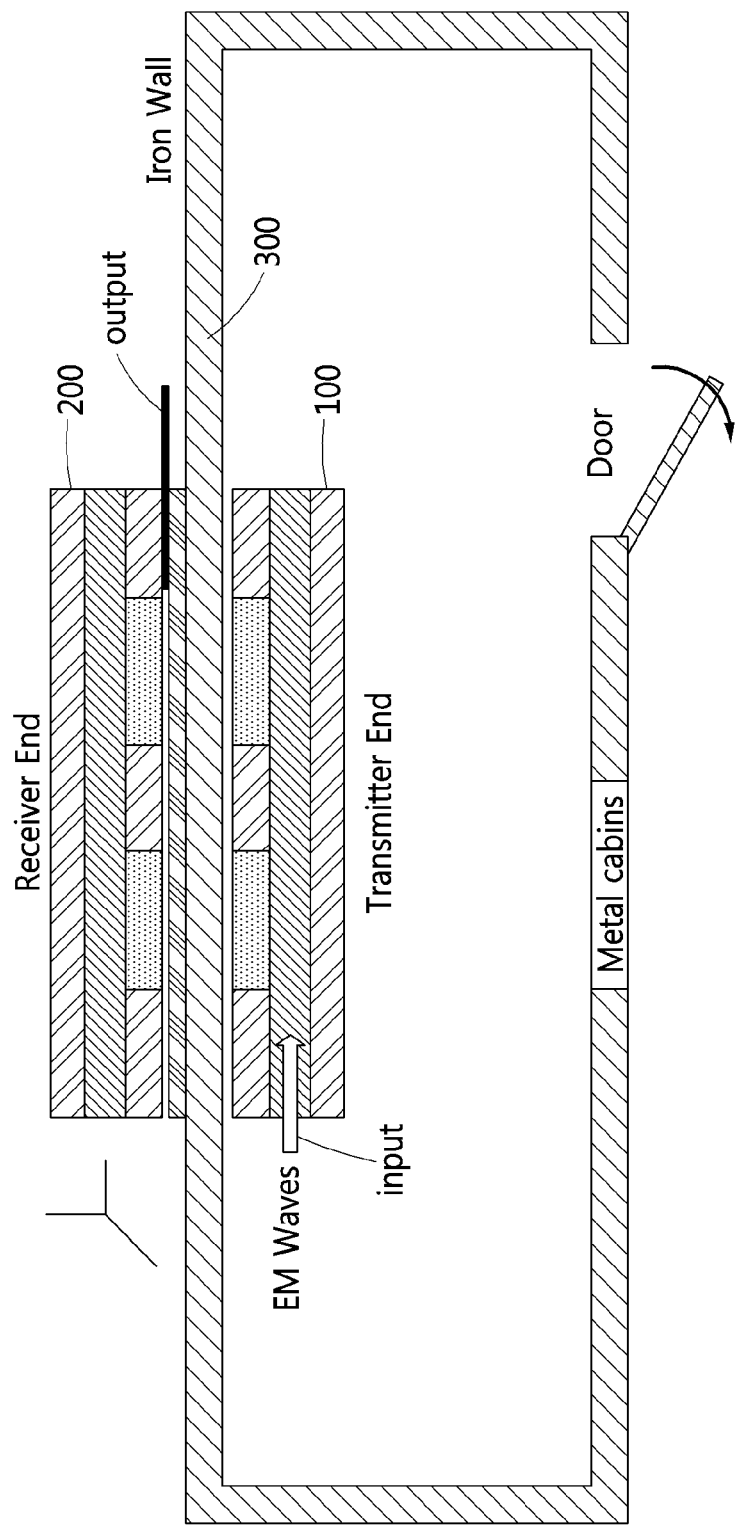
FIG. 1 is a cross-sectional view illustrating a signal and power transmission system according to an embodiment.

Hereinafter, reference will now be made in detail to embodiments of the present invention with reference to the accompanying drawings. Also, terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Further, embodiments described in this specification and elements shown in the drawings are merely preferable examples, and do not represent the entirety of the present technical idea. Accordingly, it will be appreciated that they may be replaced by various equivalents and modifications on the filing date of the present application.

FIG. 1 is a cross-sectional view illustrating a signal and power transmission system according to an embodiment.

As shown in FIG. 1, a wireless power transmission system may include a transmitter 100, and a receiver 200.

The transmitter 100 and the receiver 200 may be installed in different shielded spaces of a container or a ship having a plurality of spaces such as a control room, an engine room, and a pump room to exchange power or data. However, those application examples are exemplarily provided, and the spirit of the present invention is not limited to some examples suggested herein.

The transmitter will be described further with reference to FIGS. 2A and 2B.

Figure 2A:
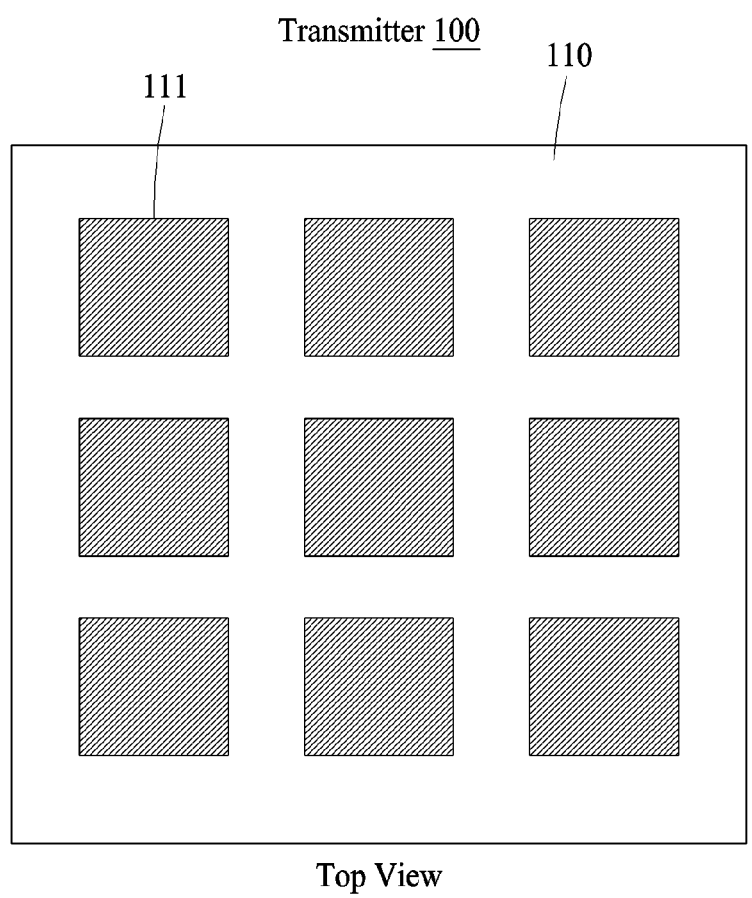
FIGS. 2A and 2B are views illustrating a transmitter of a system according to an embodiment.

For reference, FIG. 2A is a top view illustrating a transmitter of a system according to an embodiment, and FIG. 2 is a side view illustrating the transmitter of the system according to an embodiment.

Figure 2B:
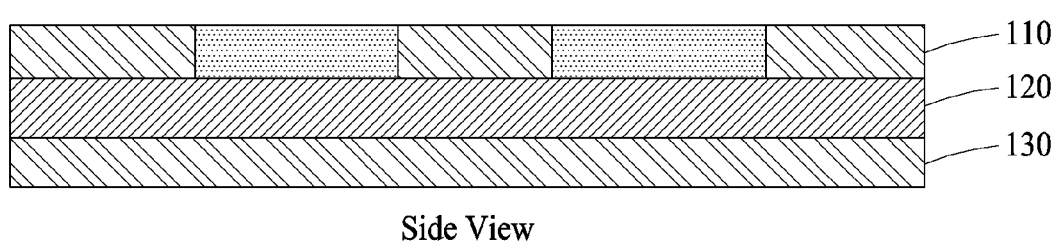

As shown in FIG. 2B, the transmitter 100 may include a first layer 110, a second layer 130, and a third layer 120 disposed between the first layer 110 and the second layer 130.

The first layer 110 may be a thin square waveguide, have at least one perforated square hole 111, and be formed of a conductive material, for example, copper. Although the hole 111 has a square shape in the shown example, the example is provided exemplarily. Thus, the shape, the number, or the arrangement of the hole 111 may be changed as necessary.

The third layer 120 may be a dielectric layer. For example, but not limited thereto, the third layer 120 may have the same thickness as the first layer 110, and be formed of carbon fiber or polycarbonate (PC).

The second layer 130 may have the same size (at least one of length, width, and thickness) as the first layer 110. The second layer 130 may function as a ground.

As described above, the transmitter 100 including the first layer 110, the second layer 130, and the third layer 120 therebetween may be disposed to be adjacent to one side of a thick metal wall 300 of a shielded space of a ship or a container, as shown in FIG. 1. For example, but not limited thereto, the transmitter 100 may generate electromagnetic (EM) waves having a frequency range of 20 megahertz (MHz) to 150 MHz.

The EM waves generated by the transmitter 100 may be propagated through the metal wall 300 and transmitted to the receiver 200. Thus, signals, for example, data, and/or power may be transmitted via the EM waves.

A principle of transmitting power or data from a transmitter to a receiver of a system according to an embodiment will be described in detail with reference to FIG. 3.

Figure 3:
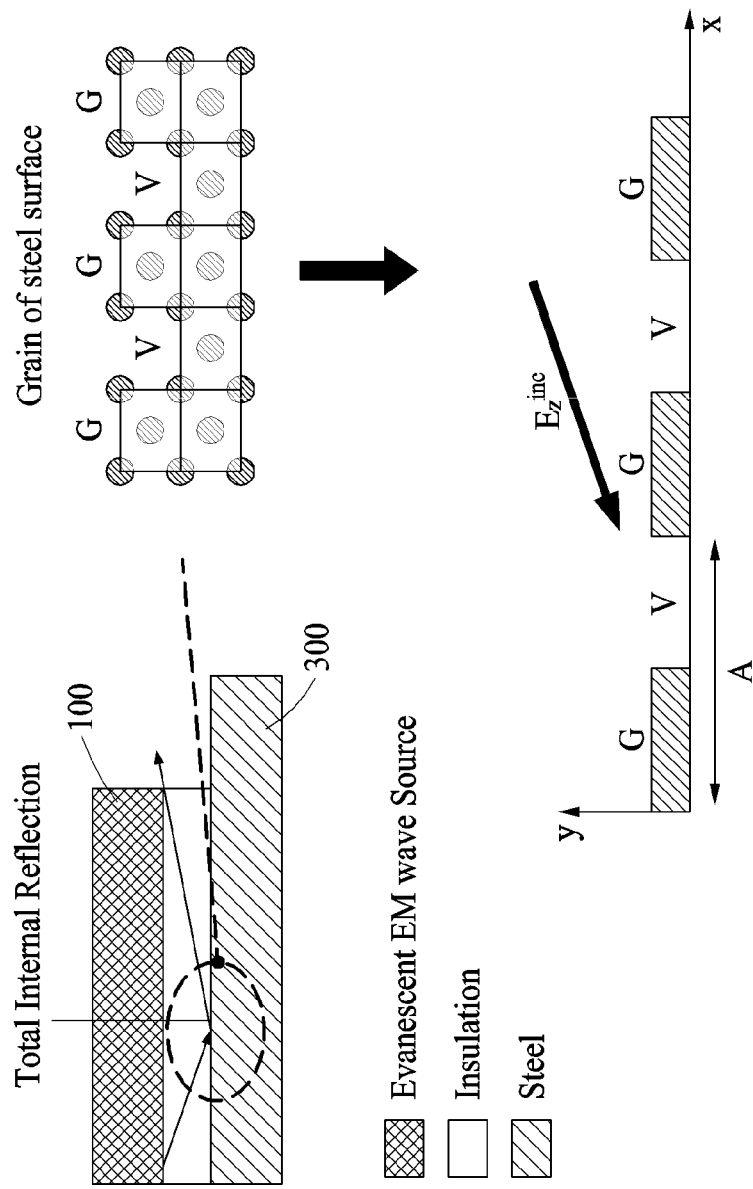
FIG. 3 illustrates a principle of transmitting power or data of a system according to an embodiment.

For reference, FIG. 3 illustrates a principle of transmitting power or data of a system according to an embodiment.

First, as shown in FIG. 3, the metal wall 300 may be provided in an uneven structure or a body centric cuboid crystal (BCC) structure including grains G and voids V, and have a predetermined cycle A.

EM waves may be generated in response to interaction between the EM waves and the metal wall 300, and the generated EM waves may be propagated through the metal wall 300.

That is, surface EM waves generated by the transmitter 100 being an evanescent EM wave source may cause total reflection at the grains G and the voids V formed based on the predetermined cycle A, and flow therein.

The EM waves causing the total reflection and flowing along an inner circumferential surface of the metal wall 300 on which the transmitter 100 is mounted may be transmitted to an outer circumferential surface of the metal wall 300 on which the receiver 200 is disposed such that the receiver 200 may receive the EM waves.

In this example, the receiver 200 receiving the surface EM waves to receive energy transmitted from the transmitter 100 may also have the same structure as the transmitter 100 including the first layer 110, the second layer 130, and the third layer 120.

Figure 4A:
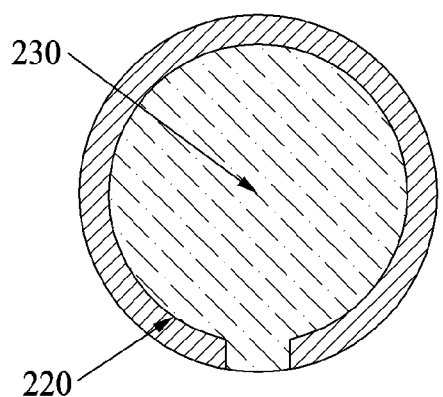
FIGS. 4A, 4B, and 4C illustrate a receiver having a cylindrical structure according to another embodiment.
Figure 4B:
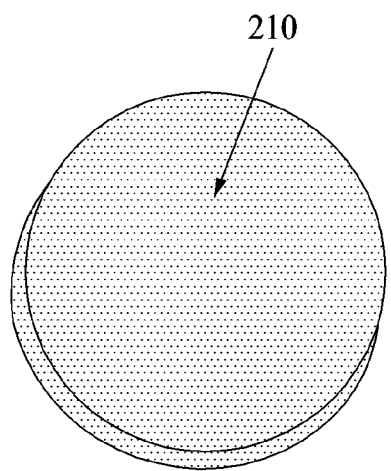
Figure 4C:
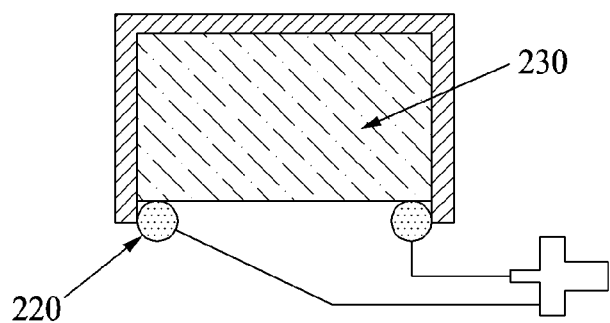

In another embodiment, as shown in FIGS. 4A, 4B, and 4C, a receiver 200 may have a cylindrical structure to receive power or data transmitted from the transmitter 100.

For reference, FIGS. 4A, 4B, and 4C illustrate a receiver having a cylindrical structure according to the other embodiment.

That is, the cylindrical receiver 200 may include a cover 210, a loop 220, and a dielectric material 230, and may be referred to as a wave trap configured to eliminate frequency interference.

The cover 210 may have a cylindrical structure with an opened bottom, and be formed of copper.

The loop 220 may be disposed at an inner edge portion of the opened bottom of the cover 210, have a hollow shape, be formed of copper, and perform a function as a rectifier that rectifies EM waves.

For example, but not limited thereto, the dielectric material 230 may be made of polystyrene, and be received in the cover 210.

Figure 5:
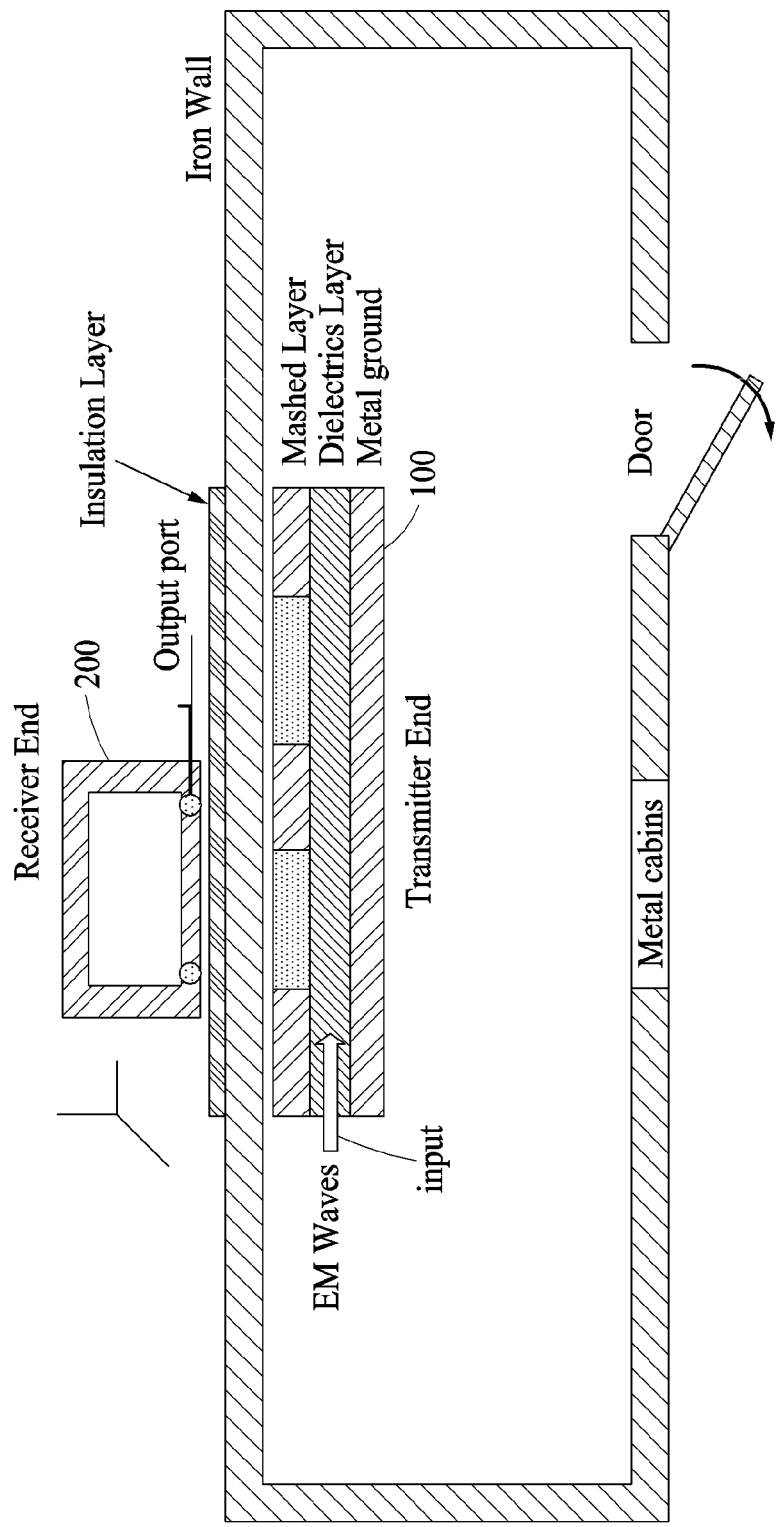
FIG. 5 is a cross-sectional view illustrating a system to which a receiver having a cylindrical structure is applied according to another embodiment.

A system to which the receiver having the cylindrical structure as described above is applied is shown in FIG. 5.

Figure 6A:
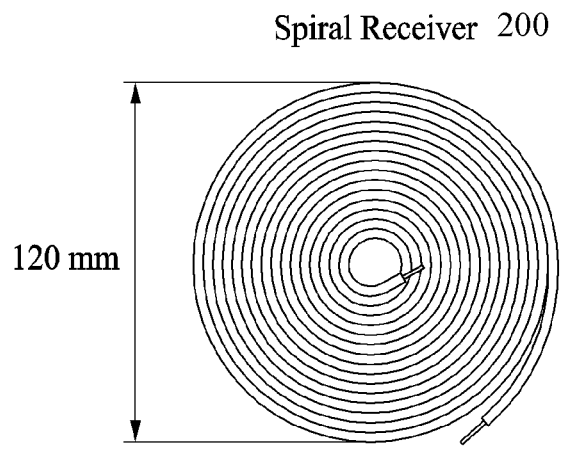
FIGS. 6A and 6B are views illustrating a receiver having a spiral structure according to still another embodiment.
Figure 6B:
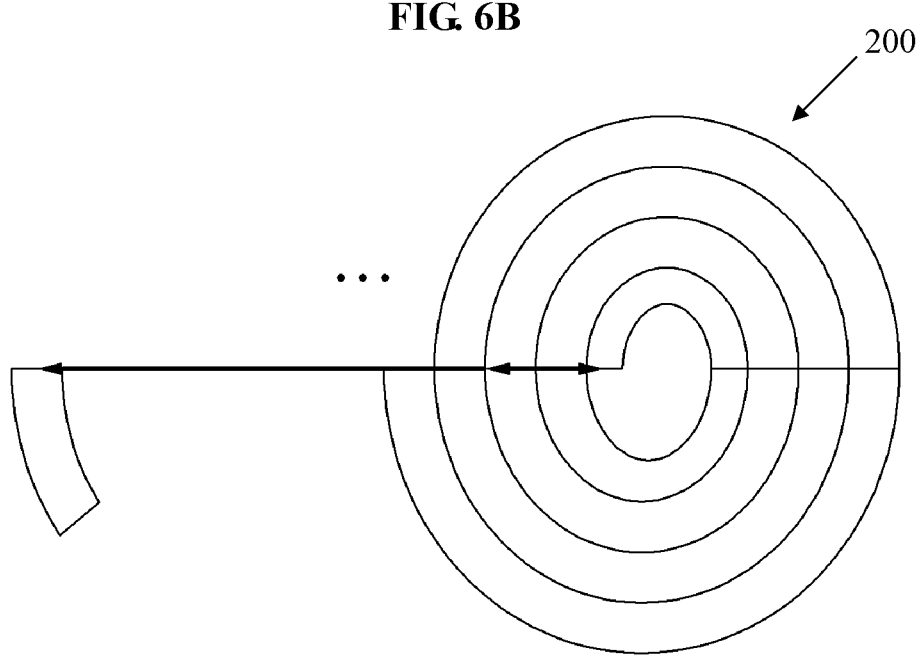

As still another embodiment shown in FIGS. 6A and 6B, a receiver 200 may be a spiral coil connected to a light emitting diode (LED)/load (communication equipment). As the spiral coil, a counterpoise wire with a length of 10 to 15 centimeters (cm) that may be used without using an electrical ground at a location where it is difficult to obtain a ground to easily ground with may be selected.

For reference, FIGS. 6A and 6B are views illustrating a receiver having a spiral structure according to still another embodiment.

According to the various embodiments described above, communication may be performed through the conductive object. For example, communication may be performed with a relatively high transmission efficiency even in an environment in which communication may not be performed using the existing scheme, for example, a space surrounded by metal partition walls. Communication may be enabled in a special environment such as a cabin of a vessel without perforating the walls to connect lines as in the past, and thus the cost efficiency, the durability, and the convenience may improve in comparison to the existing scheme.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A signal transmitting/receiving device communicating with a counterpart device using electromagnetic induction through an adjacent conductive object, the signal transmitting/receiving device comprising:
   a first layer formed of a conductive material, the first layer including at least one opening that faces the object;
   a second layer formed of a conductive material, the second layer adjacent to the first layer on an opposite side of the object; and
   a third layer formed of a dielectric material, the third layer disposed between the first layer and the second layer to exchange an electromagnetic field including a signal with the object through the opening, wherein, when the third layer receives the electromagnetic field from the object through the opening, the third layer transmits an electrical signal to the first layer and the second layer.

2. The signal transmitting/receiving device of claim 1, wherein, when the electromagnetic field is electrically fed and induced by the first layer, the third layer radiates the electromagnetic field toward the object.

3. The signal transmitting/receiving device of claim 1, wherein at least one of the first layer and the second layer includes copper.

4. The signal transmitting/receiving device of claim 1, wherein the third layer includes at least one of carbon fiber and polycarbonate.

5. A signal transmitting/receiving device communicating with a counterpart device using electromagnetic induction through an adjacent conductive object, the signal transmitting/receiving device comprising:

a first layer formed of a conductive material, the first layer including at least one opening that faces the object;

a second layer formed of a conductive material, the second layer adjacent to the first layer on an opposite side of the object; and a third layer formed of a dielectric material, the third layer disposed between the first layer and the second layer to exchange an electromagnetic field including a signal with the object through the opening wherein, when the third layer transmits the electromagnetic field to the object through the opening, the third layer receives an electrical signal from the first layer and the second layer.

* * * * *